Patented May 1, 1951

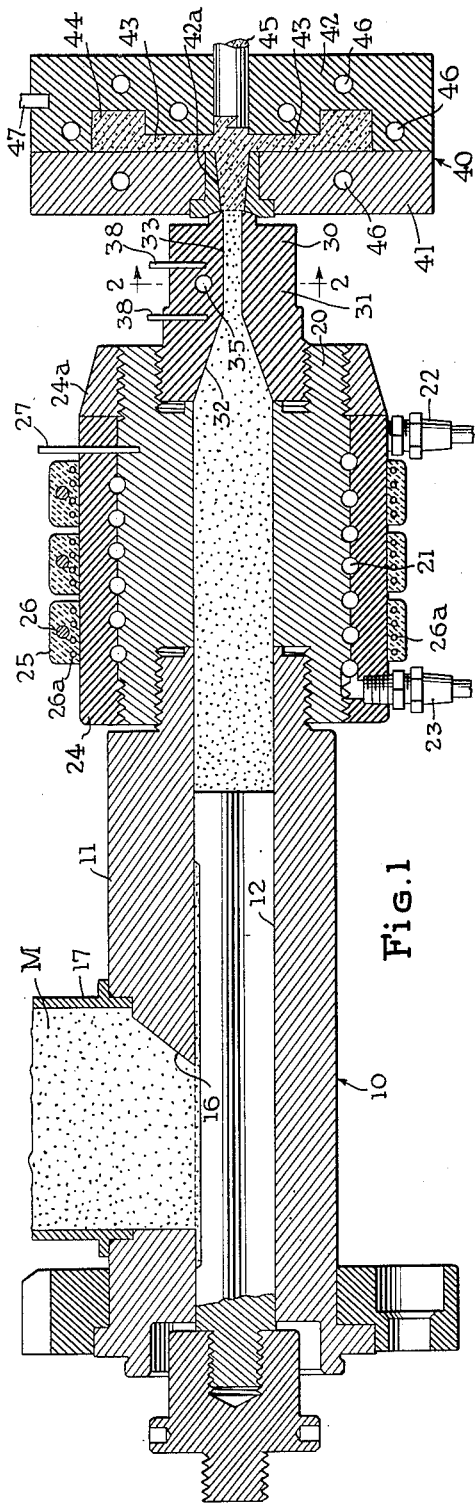
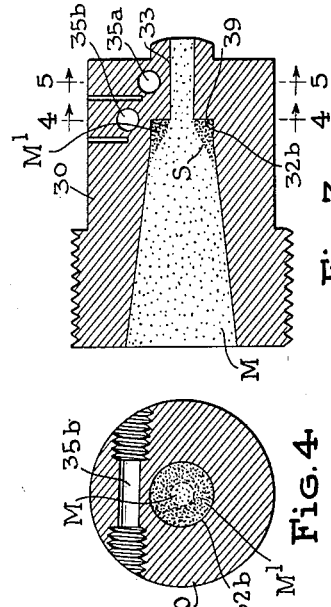
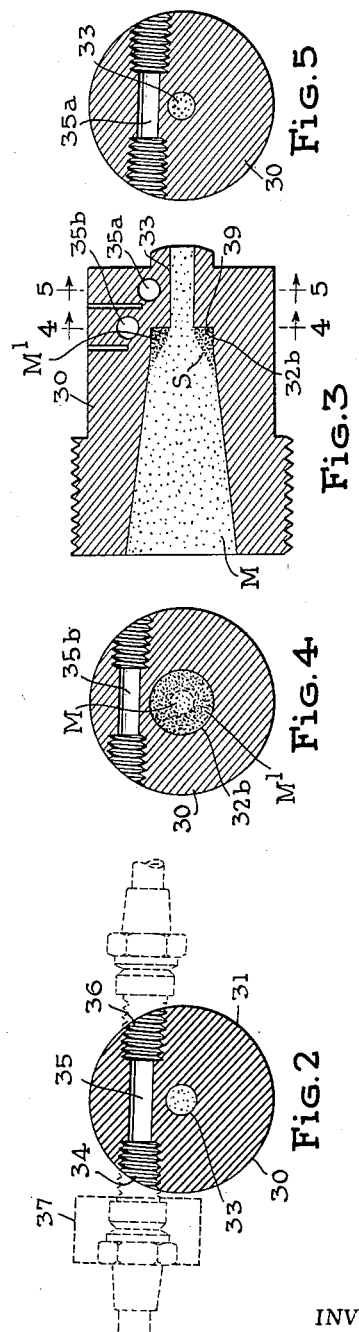

2,551,439

UNITED STATES PATENT OFFICE 2,551,439

METHOD AND APPARATUS FOR MOLDING THERMOPLASTIC MATERIALS

George J. Kovacs, Walled Lake, Mich.

Application February 7, 1949, Serial No. 75,058

19 Claims. (Cl. 18—30)

This invention relates generally to a method and apparatus for molding thermoplastic materials and has particular relation to a method and apparatus for molding thermoplastic materials of the type having a plasticizing temperature which is only relatively slightly higher than the setting temperature of the material.

In the continuous injection molding of thermoplastic materials of the type having a plasticizing temperature which is only relatively slightly higher than the setting temperature of the material, one of the foremost difficulties encountered is the running, dripping and oozing of the fluid thermoplastic material from the ejection end of the nozzle during the successive molding operations when the nozzle is out of contact with the mold. Various methods and means have been proposed heretofore for eliminating the dripping of the fluid thermoplastic material from the ejection end of the nozzle, but to date none of these methods or means have enjoyed any extensive commercial use. Thus, various types of nozzle structures have been proposed which include the use of various manually and automatically operated nozzle stops, or valves or other orifice restrictions, which are intended to mechanically stop the flow of the fluid thermoplastic material when the ejection end of the nozzle is out of contact with the mold.

In the case of certain thermoplastic materials, particularly linear polyamide condensation products such as those of the type known commercially as nylon, the relative temperature range between the plasticizing temperature and the setting temperature is only about 20° F. to 40° F., which amounts to about 10% or less of the plasticizing temperature.

Certain other thermoplastic materials have a relative temperature range between the plasticizing temperature and the setting temperature which amounts up to about 25% of the plasticizing temperature. One such material is polystyrene which has a setting temperature around 210° F. to 220° F. and a plasticizing temperature around 280° F.

Thus, it has been a problem in the art to continuously inject thermoplastic materials of this type in that the material hardens and wedges in the nozzle passage if it has not been heated to the plasticizing temperature, and on the other hand, the material is in a fluid condition at the plasticizing temperature which results in running, dripping and oozing from the ejection nozzle. Moreover, I have discovered, as set forth in my prior application S. N. 559,979, filed October 23, 1944, now Patent Number 2,460,831 that the ejection nozzle continuously accumulates heat caused by leakage, densification and friction. It is the general practice to heat the material receiving mold up to the upper setting temperature range so that the thermoplastic material will not prematurely set in the sprues or runners of the mold before the mold cavity has been completely filled. In some cases, the temperature of the mold is held relatively close to the temperature of the chamber, thus causing the mold to contribute accumulating heat to the ejection orifice of the nozzle, particularly when the nozzle and mold are in contact. Likewise, it has been the practice in the art to maintain the chamber at a fairly high plasticizing temperature in order to prevent the material from setting and hardening in the chamber, wedging in the nozzle passageway, or both.

Accordingly, it is an object of the present invention to provide a method and apparatus which will eliminate the many prior art difficulties and, in particular, will prevent the running and oozing of thermoplastic materials from the nozzle in continuous injection molding processes.

Another object of the invention is to provide a method and apparatus which will prevent the suction of fluid thermoplastic materials back into the cylinder when the piston is withdrawn back into the cylinder.

Still another object is to provide a method and apparatus for the injection molding of thermoplastic material wherein the material in the ejection orifice is constantly maintained at its lowest plasticizing temperature, thereby eliminating the dripping and oozing of the material from the ejection orifice.

A further object of the invention is to provide a process and apparatus for eliminating the aforementioned difficulties, which process and apparatus will be simple, economical and effective and will permit its application to existing, continuous injection molding methods and equipment.

These, and other objects of the invention, will be apparent from the following specification and drawing.

In my said Patent 2,460,831, I have disclosed and claimed a method and apparatus for the injection molding of thermosetting materials which involves the pressure-feeding of the thermosetting material through a restricted ejecting nozzle and removing accumulating heat from the nozzle whenever the temperature of the nozzle rises above the plasticizing temperature of the material to prevent the polymerization and setting of the material in the nozzle passage.

The present invention generally comprises the method of continuously injecting a thermoplastic material having a plasticizing temperature only relatively slightly higher than its setting temperature into a material-receiving mold which comprises pressure feeding said material into a chamber, heating said material in said chamber to a plasticizing temperature, pressure feeding said material from said chamber into and through an ejecting nozzle in the form of a substantially restricted passage, removing heat caused by leakage, densification and friction from said nozzle whenever the temperature of the nozzle rises above the lowest plasticizing temperature of said material in order to maintain said material in a semi-fluid, plastic condition, and injecting said material at said temperature from said nozzle into said material-receiving mold. Additionally, the present invention generally includes a method and apparatus for the continuous molding of thermoplastic material, involving an ejecting nozzle structure having only a slightly restricted and elongated passage associated with the chamber and terminating at its ejection end in a shoulder or transverse abutment wall provided with a relatively small ejection orifice, the abutment wall causing the accumulation of an insulating layer of thermoplastic material in the annular corner defined by the passage wall and the abutment wall. This layer serves to prevent the transmission of heat from the nozzle passage to the ejection orifice. Additionally, the preferred ejecting nozzle structure preferably includes a cooling passage disposed adjacent the ejection orifice or abutment wall, or both, and adapted to provide for the flow of a coolant fluid therethrough, and regulating means responsive to the temperature of the nozzle adjacent the orifice or abutment wall, or both, for controlling the flow of the coolant whenever the temperature of the nozzle at these points rises above the lowest plasticizing temperature of the thermoplastic material.

Referring now to the drawings, there is shown in Fig. 1 an injection molding apparatus together with a mold cavity for molding thermoplastic material. In general, this apparatus comprises a heating and plasticizing chamber wherein the thermoplastic material is preheated to a temperature which renders it plastic and fluid. This plasticizing chamber is maintained below the burning temperature of the thermoplastic material and generally considerably above its lowest plasticizing temperature. Thus, in the case of linear polyamides of the nylon type generally, the chamber is maintained between 550° F. and 700° F., depending upon the flow characteristics of the material which generally vary with the specific gravity thereof. Thus, in the case of a relatively stiff flowing material the plasticizing temperature in the chamber must be higher than is the case with a soft flowing material which can be maintained in a plastic and fluid state at a somewhat lower temperature.

A nozzle structure including an ejection orifice is associated with the plasticizing cylinder and interconnects the chamber with the sprue of the mold by contact with the sprue bushing. This nozzle structure is distinguished from conventional injection molding nozzles in that it is provided with a cooling means and preferably with a thermocouple leading to a thermostatic valve control device for maintaining the temperature of the nozzle at the lowest plasticizing temperature of the material by means of regulating the flow of coolant into the cooling passage. Thus, the present method involves the dissipation of heat conducted to the nozzle from the plasticizing chamber and also dissipates accumulating heat generated by the internal friction with the thermoplastic material both in the chamber and in the nozzle and also dissipates accumulating frictional heat caused by sliding contact of the material with the walls of the chamber and nozzle. In addition, the present method provides for the dissipation of accumulating heat in the nozzle caused by compression and densification of the material in the chamber and in its passage through the nozzle.

In the drawing,

Fig. 1 is a longitudinal sectional view of an injection molding apparatus adapted for use with my invention;

Fig. 2 is a view in section taken on line 2—2 of Fig. 1;

Fig. 3 is a longitudinal sectional view of an injection nozzle structure embodying my invention;

Fig. 4 is a view in section taken on line 4—4 of Fig. 3, and

Fig. 5 is a view in section taken on line 5—5 of Fig. 3.

Referring more particularly to the apparatus 10, the plasticizing chamber includes a cylindrical body 11 in which a piston 12 is adapted to be reciprocated by any suitable mechanism, not shown, which mechanism may be a hydraulic motor, for example. The piston is fluted intermediate its ends for permitting escape of fine particles of material from between the piston and cylinder walls. Thermoplastic material M is fed to the interior of the cylinder body 11 through an opening 16 from a hopper 17, which is mounted over the opening 16. When the piston 12 is reciprocated in the cylinder it moves to the left of the opening 16 and material drops into the cylinder and is moved toward the right by the piston into the bore of a cylindrical body 20, which is secured integrally with the member 11. The body 20 is preferably provided with a cooling system consisting of an internal passage 21, through which a coolant, such as water, may be circulated. The passage 21 is in the form of a spiral and may be formed by cutting a spiral channel about the body 20 and a complementary channel on the interior of the sleeve 24, which is secured over the body 21 by threads and preferably locked in position by a threaded collar 24a, as shown. The water enters the connection 22, which is connected with one end of the passage 21, and circulates through the passage 21, then passing from the body 20 through a connection 23. Also, the body 20 is adapted to be heated by heating units indicated at 25, which heating units may be of any suitable electrical resistance material, or it may be heated by any suitable means. In the present embodiment, however, there are shown resistance elements 26a embedded in ceramic material in the form of bands encircling the sleeve 24 and secured by bolts 26. The temperature of the member 20 is maintained approximately at a predetermined temperature, the particular temperature depending upon the type of thermoplastic material used, and I have shown a thermocouple element 27, located in the body 20 so that it is responsive to the temperature of the body. The thermocouple, in the present instance, is part of a system for controlling energization of the heater elements 26. The control system, however, is not shown, as such systems are known to those skilled in the art. Preferably, water is circulated through the body 20 when the body temperature approaches the maximum (burning) temperature. This may be controlled thermostatically by suitable means, not shown. In one embodiment of the present method involving a nylon type thermoplastic material, the temperature of the body 20 was maintained at about 600° F. to 650° F., which is the optimum plasticizing temperature range for maintaining the material M in a plastic, fluid condition, substantially above its setting temperature and below its burning temperature.

A nozzle 30 is connected, as by screw threading, with the body 20 for discharging the plastic material into the sprue of a mold 40. The nozzle 30 includes a neck portion 31, a tapered, restricting entry passage 32 and an ejection orifice 33 which is preferably of even diameter, as shown, but which may taper outwardly or flare in slight degree as shown in Fig. 3. Preferably, however, in one embodiment of the invention, the walls leading from the plasticizing chamber to the entrance of the orifice are constructed as shown in Fig. 3.

An inlet connection 34 is connected to a coolant passage or opening 35 formed in the neck portion 31 so that a cooling fluid, in the present instance water, may be led to the passage 35 and the water is discharged therefrom through an outlet connection 36. As shown, a thermostatic control valve, indicated diagrammatically at 37, is placed in the inlet 34 and is responsive to the temperature of the neck portion 31 of the nozzle for causing the passage of water to the coolant passage 35 as the temperature rises above the minimum temperature at which the material is plastic and semi-fluid, and cutting off the flow of coolant whenever the temperature lowers to the setting temperature of the material. It is essential to the successful practice of my invention that the cooling means, in the present embodiment the passage 35 and water circulation connections and control means, be so designed that it can dissipate heat from the nozzle structure rapidly enough to change the physical state of the material from a plastic and fluid condition to a semi-fluid, plastic condition such that the material will not be free-running and yet will not be in a set, solid form.

A pair of thermocouple wells are provided, one on each side of the coolant passage 35 for determining the temperature in the neck portion 31 by means of thermocouples 38, one of which is connected to the control valve 37. The selection as to which thermocouple to use depends upon the nature of the material being molded. With a free-running material of low specific gravity, it is advantageous to maintain the temperature at the juncture of the tapered inlet 32 and the ejection orifice 33 sufficiently cool to cause the material to lose its extreme fluidity at that point and it is therefore necessary to accurately determine the temperature at that point. On the other hand, with certain thermoplastic materials such as styrene, it has been found sufficient to control the flow of coolant by virtue of the temperature directly along the ejection orifice 33.

In the preferred embodiment shown in Fig. 3, the nozzle structure is provided with an inlet portion 32a which is only slightly tapered and which terminates in a shoulder or abutment wall 39, the ejection orifice 33 being similar to that shown in Fig. 1. Additionally, the inlet portion adjacent the abutment wall 39 is preferably in cylindrical form as shown at 32b to assist in maintaining an insulating barrier or layer $M^1$. By means of this construction, the lines of force at the area defined by 32b and 39 are all perpendicular or horizontal to the central longitudinal axis of the nozzle, which tends to make the barrier $M^1$ substantially permanent once it has been built up. The function of this abutment wall 39 is to retard and store material $M^1$ during the molding operation so as to provide an insulating layer $M^1$ which, according to my observations, serves to retard the passage of heat from the chamber 12, from the inlet portion 32a and from the plastic, fluid material M in the inlet portion 32a. Thermoplastic materials appear to be poor conductors of heat and therefore I have provided an excellent insulating barrier $M^1$ which, although it is continuously being substituted by new material M at a very slow rate of substitution, is nevertheless ever present during the molding operation. Moreover, according to my observations, the tapered juncture surface area S which is formed between the fast moving plastic, fluid material M and the slow moving insulating barrier $M^1$, provides the substantially exact and perfect tapered configuration for the particular material being molded. This discovery is set forth and claimed in my copending application S. N. 75,057, filed February 7, 1949.

As shown in Fig. 3, I have provided alternate coolant passages 35a and 35b and alternate thermocouple wells. By this means it is possible to cool the insulating barrier $M^1$ to either a semi-fluid, plastic stage, or to a solid, plastic stage, or permit it to remain fluid and plastic, or cause it to become fluid and plastic.

The mold structure 40 which is formed of two parts 41 and 42 has a sprue bushing 42a in the part 41 for directing the thermoplastic material to the runners 43, formed in the chamber 42. The mold 40 is provided with mold cavities 44, the cavities in this instance being illustrated as cubes, although they may be of any desired form, depending upon the shape of the article desired.

A sprue puller and knock-out rod 45 is provided, which is operated by suitable mechanism, after the mold part 42 has been separated from part 41 following a molding operation, for pulling the sprue from the sprue bushing 42a and then for knocking the sprue and its integral runners from the part 42. Also, knock-out rods may be provided for removing the molded pieces from the cavities 44, but since such knock-out rods are well known they have not been shown. It is to be understood that for the sake of clearness, the various elements for supporting the mold and its parts and the mechanism for operating the sprue puller 45 are not shown, as they may be of conventional design.

The mold 40 is maintained at a temperature approaching but below the setting temperature of the thermoplastic material so that the material will not set and harden in the sprue, runners and mold before all the cavities in the mold have been completely filled. Thus, in instances where the sprue or runners or mold cavities include relatively thin sections, it is necessary to maintain a somewhat higher mold temperature than is the case with relatively large sections.

In the case of synthetic linear polyamides of the nylon type, with a setting temperature of about 480° F., the mold is maintained at a temperature varying from 325° F. to 475° F., depending upon the type of nylon and the size of the mold sections.

The parts 41 and 42 have electrical resistance elements 46 embedded therein for heating the mold, although any other suitable heating means may be used, and the temperature of the mold is controlled by a suitable control mechanism for the heating elements, which system includes a thermocouple 47 embedded in the part 42 of the mold. The thermocouple affects the control system in a manner well known in the art and therefore this control system is not shown.

In the operation of the apparatus 10, the thermoplastic material M is placed in the hopper 17, usually in a powdered or granulated condition, and the piston 12 is operated to move the material into the bore of the body 20. The material is heated in the body 20 to a plasticizing temperature at which it becomes fluid and plastic. The sprue bushing 42a of the mold 40 is maintained in contact with the nozzle and in alignment with the nozzle orifice. The part 42 of the mold is closed on part 41, as shown in the drawing, and the piston 12 is then actuated to force the plasticized material M from the cylindrical body 20 into the entry passage 32 of the nozzle where the material M is thence forced into and through the ejection orifice 33. Considerable heat is accumulated by the nozzle and the material in the nozzle due to the densification of the material in its passage through the nozzle. Also, considerable heat is accumulated due to internal friction of the material and friction of the material being forced along and against the walls of the nozzle passage. This accumulating heat plus the heat leakage from the cylindrical body 20 causes an increase in temperature in the nozzle and the material in the nozzle. Thus, the material M in the ejection orifice 33 will normally be fluid and will run, ooze and drip from the ejection orifice when it is out of contact with the mold. However, the control valve 37 is responsive to the temperature of the nozzle through an electrical control circuit (not shown) connected to the thermocouple 38. The control circuit and valve are so regulated that whenever the temperature of the nozzle rises above the lowest plasticizing temperature of the material at which it can be maintained in a semi-fluid, plastic condition, the valve will admit coolant into the coolant passage 35 to remove the necessary amount of heat required to maintain the material in a semi-fluid, plastic state. In actual practice, I have found that by proper regulation, it is only necessary to cause the coolant to flow intermittently in droplet form into the passage 35 and this is the case with an actual nozzle of the type shown in Figs. 3, 4 and 5 which is shown in exact working dimensions.

When material is forced against the abutment wall 39, it builds up and forms an insulating barrier M¹ which prevents the transmission of accumulating heat to the ejection orifice 33. If the nozzle passage 32a is tapered up to the abutment wall 39, the material M¹ is slowly but continually being forced out of the ejection orifice 33 and being replaced by fresh plasticized material M forced into the nozzle passage. If the nozzle passage area adjacent the abutment wall 39 is of cylindrical form, as shown at 32b, I have found that the insulating barrier M¹ formed during the molding operations is substantially permanent in character. In either event, a perfect taper configuration S is formed by the barrier M¹ and this barrier M¹ serves as a part of the nozzle passage and thereby reduces the friction and resulting accumulating heat.

The plasticized material M is forced out of the ejection orifice 33 and into the mold through the sprue 42a, runners 43 and into the mold cavities 44. The interior of the sprue and runners remains somewhat plastic for an interval and provides for the transmission of material and pressure to the cavities until the material in the cavities has set and hardened. The piston acts upon the material during the setting of the material in the mold for maintaining the required pressure in the mold cavities and to fill in any shrinkages. After setting has taken place in the mold, the force of piston 12 acting on the material is relieved and the mold part 42 is removed from the part 41. It has been found that, due to maintaining the temperature in the nozzle at the lowest plasticizing temperature of the material M, the material in the ejection orifice will be maintained in a semi-fluid, plastic condition and will therefore not run, ooze or drip from the ejection end of the nozzle when it is moved out of contact with the mold. After the sprue, runners and cavities of the mold 40 have been emptied, another molding operation may be immediately performed in the same manner.

Thus, I have provided a novel mechanism and molding method which overcome and eliminate numerous difficulties encountered in injection and continuous injection molding of thermoplastic materials. By preventing the accumulation of heat in the nozzle and by maintaining the nozzle at an optimum temperature at all times, considerable saving of thermoplastic material is effected by the elimination of the usual running and oozing.

Although I have shown the preferred embodiment of my invention, it is to be understood that other forms may be adopted, which come within the scope of my invention as set forth in the following claims:

I claim:

1. The method of continuously injecting a thermoplastic material having a plasticizing temperature only relatively slightly higher than its setting temperature into a material-receiving mold which comprises pressure feeding said material into a chamber, heating said material in said chamber to a plasticizing temperature, pressure feeding said material from said chamber into and through an ejecting nozzle in the form of a substantially restricted passage, removing heat caused by leakage, densification and friction from said nozzle whenever the temperature of the nozzle rises above the lowest plasticizing temperature of said material in order to maintain said material in a semi-fluid, plastic condition, and injecting said material at said temperature from said nozzle into said material-receiving mold.

2. The method of continuously injecting a thermoplastic material having a plasticizing temperature only relatively slightly higher than its setting temperature into a material-receiving mold which comprises pressure feeding said material into a chamber, heating said material in said chamber to a plasticizing temperature, pressure feeding said material from said chamber into and through an ejecting nozzle in the form of a substantially restricted passage, removing heat caused by leakage, densification and friction from said nozzle whenever the temperature of the nozzle rises up to the lowest plasticizing temperature of said material in order to maintain said material in a semi-fluid, plastic condition, and injecting said material at said temperature from said nozzle into said material-receiving mold.

3. The method of continuously injecting a thermoplastic material having a plasticizing temperature only relatively slightly higher than its setting temperature into a material-receiving mold which comprises pressure feeding said material into a chamber, heating said material in said chamber to a plasticizing temperature, pressure feeding said material from said chamber into and through an ejecting nozzle in the form of a substantially restricted passage, removing heat caused by leakage, densification and friction from said nozzle whenever the temperature of the nozzle rises above a temperature just below the lowest plasticizing temperature of said mateiral in order to maintain said material in a semi-fluid, plastic condition, and injecting said material at said temperature from said nozzle into said material-receiving mold.

4. The method of continuously injecting a thermoplastic material having a plasticizing temperature only relatively slightly higher than its setting temperature into a material-receiving mold which comprises pressure feeding said material into a chamber, heating said material in said chamber to a plasticizing temperature, pressure feeding said material from said chamber into and through an ejecting nozzle in the form of a substantially restricted passage, removing heat caused by leakage, densification and friction from said nozzle whenever the temperature of the nozzle rises above a temperature between the highest setting temperature and the lowest plasticizing temperature of said material in order to maintain said material in a semi-fluid, plastic condition, and injecting said material at said temperature from said nozzle into said material-receiving mold.

5. The method set forth in claim 1 wherein the plasticizing temperature of the thermoplastic material is up to about 25% higher than the setting temperature.

6. The method set forth in claim 1 wherein the plasticizing temperature of the thermoplastic material is up to about 10% higher than the setting temperature.

7. The method set forth in claim 1 wherein the thermoplastic material comprises a synthetic linear polyamide.

8. In the method of continuously injecting a thermoplastic material into a material-receiving mold, including the pressure feeding of said material into and through a chamber and the heating of said material in said chamber to a temperature in the range defined by the plasticizing temperature and the burning temperature of said material, the steps which comprise cooling said material to a lower range plasticizing temperature whenever the temperature of the chamber rises to the range defined by the higher range plasticizing temperature and the burning temperature of the material therein, pressure feeding said material from said chamber into and through an ejection nozzle in the form of a substantially restricted passage, removing heat caused by leakage, densification and friction from said nozzle whenever the temperature of the nozzle rises above the lowest plasticizing temperature range of said material, maintaining said material in the outer end of said nozzle passage in a semi-fluid, plastic condition to prevent running and dripping thereof from said nozzle passage end, and injecting said material at a temperature between the highest setting temperature and the lowest plasticizing temperature from said nozzle into said mold.

9. The method of continuously injecting a thermoplastic material having a plasticizing temperature only relatively slightly higher than its setting temperature into a material-receiving mold which comprises pressure feeding said material into a chamber, heating said material in said chamber to a plasticizing temperature, pressure feeding said material from said chamber into an ejecting nozzle having a slightly restricted and elongated passage associated at one end with said chamber and terminating at its ejection end in a transverse abutment wall provided with a relatively small ejection orifice, accumulating thermoplastic material in the storage corner defined by the passage wall and the abutment wall to provide an insulating layer against the transmission of heat from the nozzle passage to the nozzle ejection orifice, removing the heat caused by leakage, densification and friction from said orifice whenever the temperature of said orifice rises above the lowest plasticizing temperature of said material, maintaining said material in a semi-fluid, plastic condition in said orifice, and injecting said material at said temperature from said nozzle orifice into said material-receiving mold.

10. The method of continuously injecting a thermopastic material having a plasticizing temperature only relatively slightly higher than its setting temperature into a material-receiving mold which comprises pressure feeding said material into a chamber, heating said material in said chamber to a plasticizing temperature, pressure feeding said material from said chamber into an ejecting nozzle having a slightly restricted and elongated passage associated at one end with said chamber and terminating at its ejection end in a transverse abutment wall provided with a relatively small ejection orifice, accumulating thermoplastic material in the storage corner defined by the passage wall and the abutment wall to provide an insulating layer against the transmission of heat from the nozzle passage to the nozzle ejection orifice, removing heat caused by leakage, densification and friction from said orifice whenever the temperature of said orifice rises up to the lowest plasticizing temperature of said material, maintaining said material in a semi-fluid, plastic condition in said orifice, and injecting said material at said temperature from said nozzle orifice into said material-receiving mold.

11. The method of continuously injecting a thermoplastic material having a plasticizing temperature only relatively slightly higher than its setting temperature into a material-receiving mold which comprises pressure feeding said material into a chamber, heating said material in said chamber to a plasticizing temperature, pressure feeding said material from said chamber into an ejecting nozzle having a slightly restricted and elongated passage associated at one end with said chamber and terminating at its ejection end in a transverse abutment wall provided with a relatively small ejection orifice, accumulating thermoplastic material in the storage corner defined by the passage wall and the abutment wall to provide an insulating layer against the transmission of heat from the nozzle passage to the nozzle ejection orifice, removing heat caused by leakage, densification and friction from said orifice whenever the temperature of said orifice rises above a temperature just below the lowest plasticizing temperature of said material, maintaining said material in a semi-fluid, plastic condition in said orifice, and injecting said material at said temperature from said nozzle orifice into said material-receiving mold.

12. The method of continuously injecting a thermoplastic material having a plasticizing temperature only relatively slightly higher than its setting temperature into a material-receiving mold which comprises pressure feeding said material into a chamber, heating said material in said chamber to a plasticizing temperature, pressure feeding said material from said chamber into an ejecting nozzle having a slightly restricted and elongated passage associated at one end with said chamber and terminating at its ejection end in a transverse abutment wall provided with a relatively small ejection orifice, accumulating thermoplastic material in the storage corner defined by the passage wall and the abutment wall to provide an insulating layer against the transmission of heat from the nozzle passage to the nozzle ejection orifice, removing the heat caused by leakage, densification and friction from said orifice whenever the temperature of said orifice rises above a temperature between the highest setting temperature and the lowest plasticizing temperature of said material, maintaining said material in a semi-fluid, plastic condition in said orifice, and injecting said material at said temperature from said nozzle orifice into said material-receiving mold.

13. The method set forth in claim 9 wherein the plasticizing temperature of the thermoplastic material is up to about 25% higher than the setting temperature.

14. The method set forth in claim 9 wherein the plasticizing temperature of the thermoplastic material is up to about 10% higher than the setting temperature.

15. The method set forth in claim 9 wherein the thermoplastic material comprises a synthetic linear polyamide.

16. In the method of continuously injecting a thermoplastic material into a material-receiving mold, including the pressure feeding of said material into and through a chamber and the heating of said material in said chamber to a temperature in the range defined by the plasticizing temperature and the burning temperature of said material, the steps which comprise cooling said material to a lower range plasticizing temperature whenever the temperature of the chamber rises to the range defined by the higher range plasticizing temperature and the burning temperature of the material therein, pressure feeding said material from said chamber into an ejection nozzle having a slightly restricted and elongated passage associated at one end with said chamber and terminating at its ejection end in a transverse abutment wall provided with a relatively small ejection orifice, accumulating thermoplastic material in the storage corner defined by the passage wall and the abutment wall to provide an insulating layer against the transmission of heat from the nozzle passage to the nozzle ejection orifice, removing heat caused by leakage, densification and friction from said orifice whenever the temperature of said orifice rises above the lowest plasticizing temperature range of said material, maintaining said material in a semi-fluid, plastic condition in said orifice, and injecting said material at said temperature from said nozzle orifice into said material-receiving mold.

17. In an apparatus for the continuous molding of thermoplastic material, including a material-receiving mold, a chamber for receiving and densifying the thermoplastic material and for heating said material to its plasticizing temperature, a pressure plunger at one end of said chamber for forcing said material through said chamber and thereby densify said material, an ejecting nozzle structure having a slightly restricted and elongated passage associated at one end with the other end of said chamber and terminating at its ejection end in a transverse abutment wall provided with a relatively small ejection orifice, said passage wall and said abutment wall defining a storage corner for the accumulation of an insulating layer of thermoplastic material to prevent the transmission of heat from said nozzle passage to said nozzle ejection orifice, heat-transferring means including a cooling passage disposed adjacent said ejection orifice and adapted to provide for the flow of a coolant fluid therethrough, regulating means responsive to the temperature of the nozzle orifice for controlling the rate of flow of the coolant fluid into said coolant passage whenever the temperature of the nozzle orifice rises above the lowest plasticizing temperature of the thermoplastic material to remove excess accumulating heat caused by leakage, densification and friction of the material in the nozzle passage, thereby maintaining the material in the orifice in a semi-fluid, plastic condition.

18. The combination set forth in claim 17, wherein the cooling passage is positioned adjacent and above the ejection orifice.

19. The combination set forth in claim 17, wherein the cooling passage is positioned above the ejection orifice and adjacent both the ejection orifice and the abutment wall.

GEORGE J. KOVACS.

REFERENCES CITED

The following references are of record in the file of this patent:

UNITED STATES PATENTS

| Number | Name | Date |
| --- | --- | --- |
| 2,043,584 | Husted | June 9, 1936 |
| 2,111,857 | Jeffery | Mar. 22, 1938 |
| 2,309,729 | Gordon | Feb. 2, 1943 |
| 2,344,176 | Shaw | Mar. 14, 1944 |